May 20, 1952 C. T. SCULLY 2,597,038

TWO-WAY ELECTRIC PULSE COMMUNICATION SYSTEM

Filed Nov. 9, 1948 5 Sheets-Sheet 1

INVENTOR.
CHARLES THOMAS SCULLY

BY Robert Harding Jr.

ATTORNEY

INVENTOR.
CHARLES THOMAS SCULLY
BY Robert Harding Jr.
ATTORNEY

May 20, 1952 C. T. SCULLY 2,597,038

TWO-WAY ELECTRIC PULSE COMMUNICATION SYSTEM

Filed Nov. 9, 1948 5 Sheets-Sheet 3

INVENTOR.
CHARLES THOMAS SCULLY

BY Robert Harding Jr.

ATTORNEY

May 20, 1952 C. T. SCULLY 2,597,038

TWO-WAY ELECTRIC PULSE COMMUNICATION SYSTEM

Filed Nov. 9, 1948 5 Sheets-Sheet 4

INVENTOR.
CHARLES THOMAS SCULLY

BY Robert Harding Jr.

ATTORNEY

May 20, 1952 C. T. SCULLY 2,597,038

TWO-WAY ELECTRIC PULSE COMMUNICATION SYSTEM

Filed Nov. 9, 1948 5 Sheets-Sheet 5

INVENTOR.
CHARLES THOMAS SCULLY

BY Robert Harding Jr.

ATTORNEY

Patented May 20, 1952

2,597,038

UNITED STATES PATENT OFFICE 2,597,038

TWO-WAY ELECTRIC PULSE COMMUNICATION SYSTEM

Charles Thomas Scully, London, England, assignor to International Standard Electric Corporation, New York, N. Y., a corporation of Delaware Application November 9, 1948, Serial No. 59,165
In Great Britain November 19, 1947

10 Claims. (Cl. 179—15)

The present invention relates to two-way electric pulse time modulation communication systems in which the pulses are transmitted in both directions over the same communication medium. Such a medium may, for example, consist of, a single circuit in a co-axial or other type of cable, or may be a radio or other carrier wave channel using the same carrier frequency for both directions.

The invention applies to two-way communication systems of the kind in which signals are transmitted only in one direction at a time, such for example, as ordinary speech communication systems, or half duplex telegraph systems.

The principal object of the invention is to economise the time available for the transmission of signals, whereby the number of channels which can be operated over a transmission path having a given band-width may be increased without degrading the quality of the transmission.

Two-way pulse communications stems have hitherto normally been treated as effectively two separate systems operating in opposite direction. When a common medium is used for both directions it has been usual to divide the transmitting time into a number of equal channel periods each of which is allotted to a corresponding channel pulse which may occur at any time in the period, and half the channel periods are allotted to the transmission of signals in one direction, and the other half to the transmission of signals in the other direction. It will be evident that in a speech or half-duplex telegraph system, half the available signalling time will always be wasted.

The object of the present invention is therefore achieved by allotting each of the channel periods jointly to the two pulses employed for transmitting signals in both directions of the corresponding two-way channel, the pulses being so timed that the maximum total time excursion of each of them exceeds half the allotted channel periods and may cover very nearly the whole of the said period.

The invention will be described with reference to the accompanying drawings, in which.

In this specification, the system recurrence period T is the period of repetition of the pulses employed to convey the signals of one channel in one direction, and is also the signalling period defined by the sychronising signals which may be transmitted with the channel pulses. The system of the invention has its chief application when speech signals are transmitted, as in the usual two way telephone. With such signals, two channel pulse trains are used, one being transmitted in each direction. If the two corresponding channel intervals are made adjacent in time at each terminal station, and providing the time of pulse travel between any two stations is equal to the system recurrence period, or an exact multiple of it, these channel intervals will always be adjacent at any station of the system, and together will form the channel period allotted to the two-way channel.

The pulses, in each channel period, may be regarded as twin pulses, and are so arranged that part of the channel period is common to both, and may be occupied by either pulse when that pulse is phased by modulation. If the pulse trains transmitted in each direction is so timed that with maximum excursion of the modulated pulse, sufficient time is left to allow reception and re-transmission of the other unmodulated pulse, there will be no suppression or interference of the pulses unless both are modulated at one and the same time. If the channels are those of a two-way telephone system, only one person will speak at a time and hence only one of the channel pulse trains will be modulated; should both speak together, the result at either end is unintelligible and the additional distortion due to random suppression or interference of the pulses is of no importance.

Figure 1:
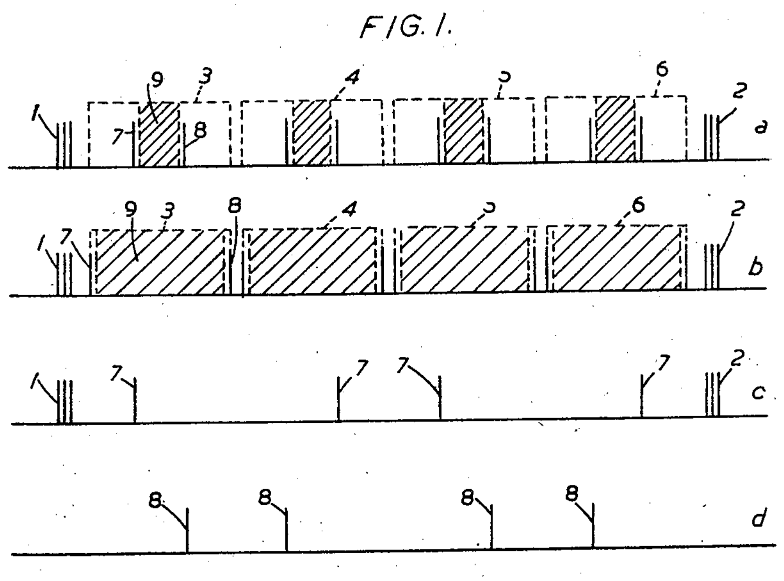
Fig. 1 shows pulse diagrams used in explaining the principles of the invention.

Fig. 1 curve *a* shows one system occurrence period at one terminal station A defined by two synchronising signals 1 and 2 each of which is shown in the form of a close group of three similar pulses, but they could take any other desired form. The system recurrence period is divided into four channel periods indicated by the dotted outlines 3, 4, 5, and 6, each channel period covering the maximum limits of time displacement of the twin channel pulses 7 and 8 which are shown in the unmodulated positions in period 3. The pulse 7 will be assumed to represent the pulse transmitted from station A to station B for channel 1 of the system, so that pulse 8 represents the pulse received at station A from station B for the same channel.

The shaded portion of 9 of the channel period represents that part of the period which can be entered by either pulse. It will be clear that in order to prevent any interference betwen the two pulses 7 and 8, the unmodulated time spacing should be slightly greater than the maximum time excursion in one direction of either pulse, produced by the modulation. The pulses 7 and 8 in their unmodulated positions thus divide the channel period into three nearly equal sections.

At station B, the arrangements will be the same except that the earlier pulse 7 will represent the pulse received from station A while the later pulse 8 will represent the pulse transmitted from station B.

It has already been stated that the arrangements must be such that the time taken for a pulse to travel from station A to station B is equal to the system recurrence period T or to an integral multiple of this period. It will be clear that when this condition is fulfilled a pulse such as 7 transmitted from station A at, say, $t$ seconds after the commencement of the system recurrence period will arrive at station B also $t$ seconds after the commencement of the next or a later system recurrence period, that is, it will be in the same relative position in the corresponding later channel period 3. Likewise, a pulse such as 8 transmitted from station B will arrive at station A also in the same relative position in the corresponding later channel period 3. The two pulses in the same channel period at each station therefore always belong to the same channel. It will be noted that each pulse, when modulated, employs nearly two thirds of the channel period. If the system had been treated on the basis of using entirely separate channels for the two directions, then each pulse could only employ slightly less than half the channel period, so that only three channels could have been obtained instead of four on the assumption that the depth of time modulation employed is the same in both cases. In other words, the arrangement described with reference to Fig. 1 curve $a$ enables an increase of about 33⅓% in the number of channels to be obtained.

This arrangement assumes that when modulated, the pulse oscillates in time equally on either side of the unmodulated position. However, a greater saving of transmission time can be obtained if the pulse is arranged to be at one extremity of its movement when no signals are passing in the corresponding direction, the type of modulation being that described in U. S. Patent No. 2,308,639, issued to W. A. Beatty-C. T. Scully on January 19, 1943, for "Signalling and Communication Systems."

This scheme is illustrated in curve $b$ Fig. 1. The channel periods 3, 4, 5, 6 are the same as in curve $a$ but the idle positions of the pulses 7 and 8 are shown respectively at the beginning and end of the channel period 3. Arrangements which will be explained later are provided to shift the transmitted pulse 7 or 8 so that when unmodulated it occupies a position near the centre of the channel period, directly transmission in the corresponding direction begins. It will be seen that now the period of overlap 9 of the movements of the two pulses covers nearly the whole of the channel period. Comparing curves $a$ and $b$, it will be seen that although four channels are shown in each case, the total possible excursion of either pulse in curve $b$ is nearly 50% greater than in the case of curve $a$. Alternatively, for the practically same total excursion of either pulse, six channels could have been accommodated instead of four in the case of curve $b$. As already mentioned, if two entirely independent channels had been used for transmission in the two directions, only three channels could have been accommodated, so the arrangement illustrated in curve $b$ will provide nearly double the number of two way channels for the same quality of transmission.

As in the case of curve $a$, if pulse 7 represents the transmitted pulse at station A, then pulse 8 will represent the pulse received from station B. Likewise at station B, the transmitted and received pulses will be represented respectively by pulses 8 and 7. Also as in the case of curve $a$, the time taken for a pulse to travel from one station to the other should be equal to T, or to an integral multiple thereof.

Although, for illustration only four two-way channels have been assumed, it will be understood that the same principles apply when there are any number of such channels.

It should also be pointed out that only one train of synchronising signals 1, 2 is essential for synchronising all the equipment at both stations, and they may be transmitted from station A or from station B as may be convenient.

As usual, when the same communication medium is used for both directions of transmission, arrangements should be made to ensure that the receiver is blocked when a pulse is transmitted. This may be done either by transmitting to the receiver a blocking pulse coincident with the transmitted pulse, in which case the receiver can receive pulses at any other time, or preferably, arrangements should be made to block the receiver for that portion of the channel period during which a received pulse may not occur, so giving an increased freedom from noise. If desired a single transmitter and receiver may be used for both directions. If for example, station B is a repeater station between two stations A and C, the repeated pulses will be transmitted back to station A as well as forward to station C. If the pulse 7 represents the transmitted pulse for the direction A—B—C, it will be evident that a pulse repeated back to A from B will arrive at A during the transmission period when the receiver A is blocked, and so will have no effect. It will be clear also that the same transmitter may be used at a repeater station for transmitting both the pulse 7 for the direction A—B—C and the pulse 8 for the direction C—B—A.

It will be clear that although it has been assumed that phase modulation of the pulses is employed, it is also possible to use duration modulation without any modification of the principles which have been explained.

When a cable circuit or dielectric guide is employed as the communication medium, reflections which are sometimes appreciable occur from small impedance irregularities at the joints. Such reflections will act in the same manner as pulses transmitted backwards from a repeater and it should preferably be contrived if possible so that a pulse reflected from a bad irregularity arrives during a transmission period, when the receiver will be blocked. One way of arranging this would be to insert into the transmission path a delay network, the impedance of which accurately matches that of the cable or guide, the delay being such that the reflected pulse returns during the transmission period.

There are, however, several other methods of dealing with reflections at joints which have no particular bearing on the present invention.

Figure 2:
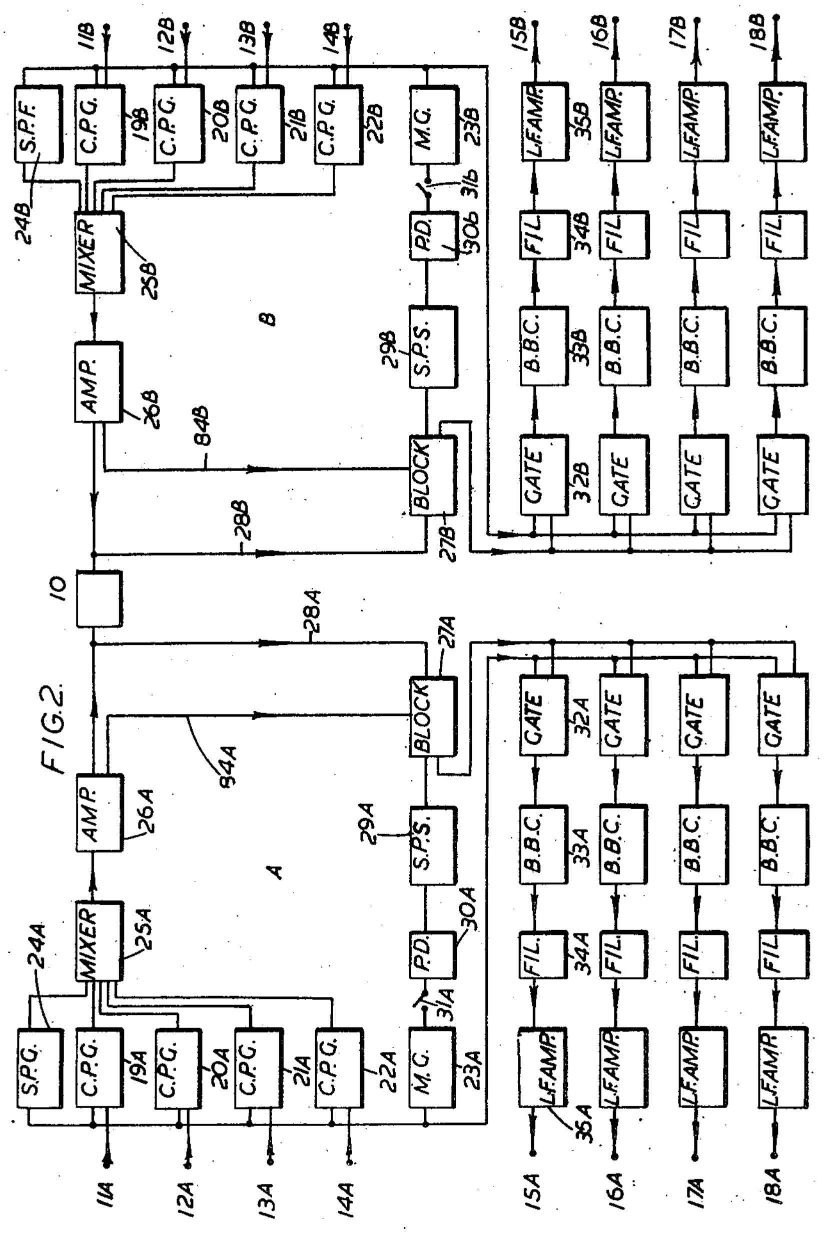
Fig. 2 shows a block schematic circuit diagram of a multichannel pulse communication system according to the invention.

Fig. 2 gives a block circuit diagram of a four-channel pulse communication system according to the invention. In the block circuit diagram, two terminal stations A and B are shown joined by any type of communication path 10. Similar elements at these stations are given the same designation numbers, distinguished by the letters A and B. Input signals applied to terminals 11A, 12A, 13A and 14A appear at the output terminals 15B, 16B, 17B and 18B. Likewise, input signals applied at terminals 11B, 12B, 13B and 14B appear at output terminals 15A, 16A, 17A and 18A.

At terminal A, the terminals 11A to 14A are connected to four similar channel pulse generators 19A, 20A, 21A and 22A. These are also applied with suitable saw-tooth waves having a recurrence period of T from a master generator 23A. The circuit of one of the channel pulse generators is given by Fig. 3. Block 24A represents a synchronizing pulse generator also controlled by the master generator 23A. This generates close triplets of pulses similar to 1 and 2 of Fig. 1. The pulses from elements 19A to 22A are 24A combined in the mixer 25A followed by an amplifier 26A and are transmitted to the communication path 10. Curve *c*, Fig. 1 shows the pulses transmitted from station A, in their unmodulated positions.

Figure 4:
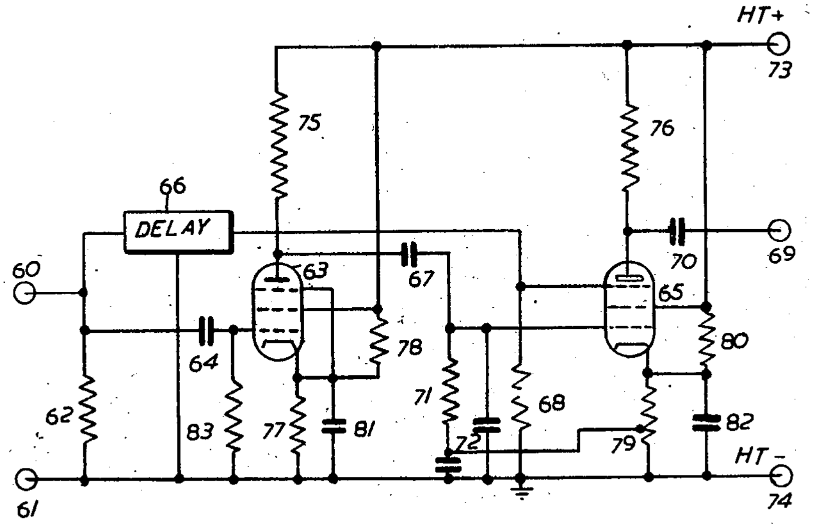
Fig. 4 shows a schematic circuit diagram of a blocking arrangement for the receiver of the system.

A receiver blocking circuit 27A is also connected to the output of the amplifier 26A and details are given in Fig. 4. Its function is to prevent the transmitted pulses from entering the receiver, but allowing pulses received from the path 10 over conductor 28A to do so. It feeds the received pulses to a synchronising pulse separator 29A and also the four channel demodulating circuits. The synchronising circuits obtained from the separator 29A are passed through a suitable phasing device 30A to control the master generator 23A if the switch 31A is closed.

Figure 5:
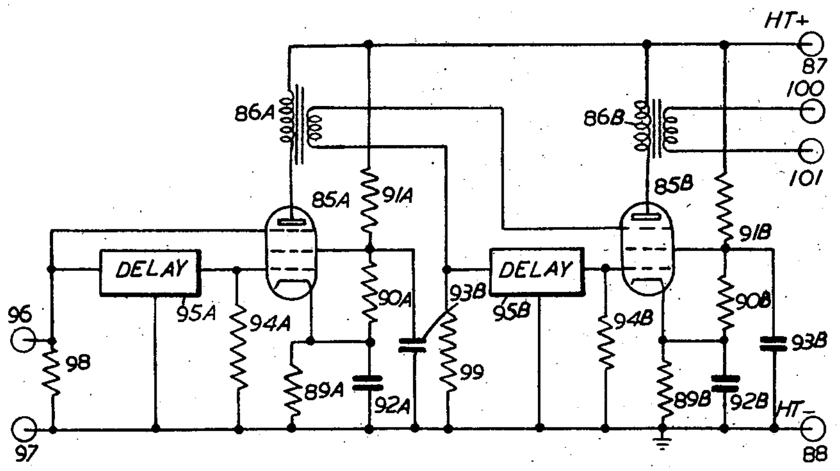
Fig. 5 shows details of the synchronising pulse separator employed in the system.

The channel demodulating circuits are all similar, and are connected in parallel to the blocking circuit 27A. The first of them comprises a gating circuit 32A controlled by the master generator 23A, a build-back circuit 33A for producing duration modulated pulses, a low-pass filter 34A and a speech frequency amplifier 35A connected to the output terminal 15A. Fig. 5, gives details of a circuit which includes both elements 32A and 33A. No circuit details are given for elements 23A, 25A, 26A, 30A, 34A or 35A since these are well known devices.

A circuit for the synchronising pulse generator 24A adapted to produce triplets of pulses is given in the specification of co-pending U. S. application Serial No. 594,870, filed May 21st 1945, now Patent No. 2,542,991, granted February 27, 1951.

The function of the gating circuits similar to 32A is to produce rectangular gating pulses for rendering the build-back circuits 33A responsive to the proper channel pulses for producing corresponding duration modulated pulses. These, when filtered and amplified, give speech output in the usual way.

The arrangements at stations B are exactly similar to those at station A, except that the channel pulse generators will be timed to generate each pulse at a different time in the channel period as shown in curve *d*, Fig. 1 which shows the *c* pulses as received at station A. It will be noted that when curves *c* and *d* are combined, curve *a* will be obtained. It will be noted from curves *c* and *d* that the transmitted pulse is the early pulse for the odd numbered channels and the late pulse for the even numbered channels. This arrangement is not essential but it is more favourable as regards crosstalk.

It has already been pointed out that synchronising signals need only be transmitted in one direction. Thus it is not essential that both the synchronising pulse generators 24A and 24B be provided. Thus, if station A is to be the controlling station, the generator 24B may be omitted, and then the elements 29A, 30A and 31A at station A can also be omitted, and the switch 31B at station B will be closed, or omitted and replaced by a direct connection. The master generator 23B will then be synchronised to the master generator 23A by the synchronising signals. However, it may be convenient to make that station B sometimes the controlling station, and in the case, all the elements shown will be provided, and switch 31B is closed when A is to be the controlling station, while switch 31A is closed when B is to be controlling station.

The system can also be operated with both switches closed. In that case the frequency of both the master generators 23A and 23B will be determined by the pulse transit time between the stations A and B, and in this way the system recurrence period T will be automatically adjusted to accommodate small changes in the pulse transmit time between stations resulting from temperature changes or from any other cause.

Figure 3:
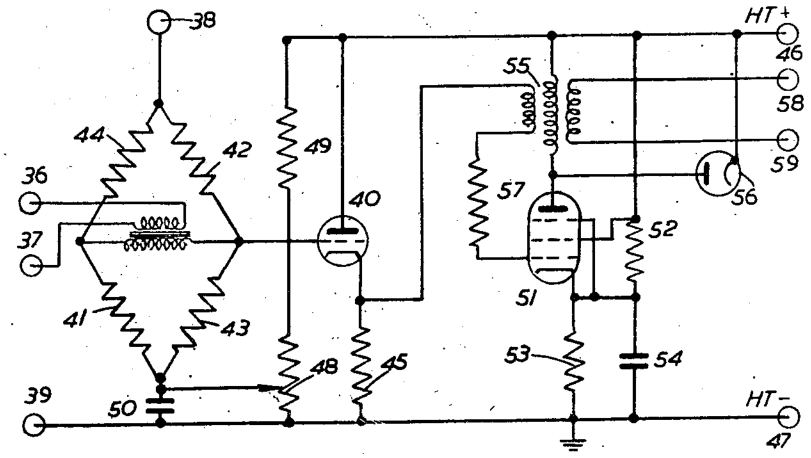
Fig. 3 shows a schematic circuit diagram of a pulse modulator employed in the system.

Details of one of the channel pulse generators similar to 19A are shown in Fig. 3. In this figure, the speech signal is applied to the input terminals 36 and 37 and the output from the master generator 23A is applied to terminals 38 and 39.

The speech and saw-tooth waves are applied to the grid of valve 40 through a bridge network of equal resistances 41, 42, 43 and 44. The speech wave is applied by a transformer connected between two diagonal points of the bridge, thus preventing the saw-tooth wave from being transmitted back into the speech circuit. Speech frequencies are prevented from producing cross-talk in other channels by giving the master generator 23A a low impedance at speech frequencies. The valve 40 acts as a cathode follower, and the combined speech and saw-tooth waveforms appear across the cathode resistance 45.

The anode of the valve 40 is connected directly to the position terminal 46 for the high tension source (not shown) the negative terminal 47 therefore being grounded. Bias for the control grid is obtained from a potentiometer 48 connected in series with a resistance 49 between terminals 46 and 47. The lower corner of the bridge is connected to the potentiometer, contact and to ground through a by-pass condenser 50.

The pulse generating valve 51 is normally biased and cut off by a resistance chain 52, 53 connected between terminals 46 and 47, the resistance 53 being shunted by a by-pass condenser 54. When the positive voltage produced by the combined wave-forms across resistance 45 exceeds the cut-off bias, valve 51 conducts and, owing to the positive feed-back coupling between the anode and control grid produced by the transformer 55, generates a half-sine-wave having a period controlled by the anode winding of transformer 55 and the stray capacities associated therewith. The valve is prevented from continuing its oscillation by the action of diode 56 connected across this winding which short-circuits the negative swing of the oscillation and, provided the voltage across resistance 38 is rising fast enough, due to the applied saw-tooth wave, the valve 51 will be biased by grid current flowing through resistance 57 and the anode will be saturated by the time the next positive swing should occur. The valve 51 therefore generates a pulse, half sine-wave in shape, whose timing is controlled the time at which the voltage across resistance 45 exceeds a given positive value. Since this voltage depends on the sum of the saw-tooth wave and speech voltages, the output pulse of valve 51, which may be obtained from terminals 58 and 59 connected to a third winding of the transformer 55, will be time-phased by the speech signal. The time position at which the pulse occurs in the absence of a speech signal, that is, its unmodulated position, may be controlled by adjustment of the bias potentiometer 48 which varies the initial anode current of valve 40, thereby altering the initial voltage across resistance 45, and by suitably setting the bias potentiometer 48 the unmodulated positions of the pulses 7 and 8 Fig. 1, curve *c* or *d* in the corresponding channel period for each of the four channels may be adjusted.

Fig. 4 shows details of the blocking circuit 27A. The pulses on conductor 28A (Fig. 2) are applied to terminals 60 and 61, (in positive sense to terminal 60), which are shunted by a terminating resistance 62. Terminal 61 is grounded and terminal 60 is connected to the control grid of a valve 63 through a condenser 64, and to the suppressor grid of a valve 65 through a delay line 66. The valve 63 is biased beyond the cut-off in such manner that pulses received from station B are unable to unblock it, but so that the much larger pulses transmitted from station A can unblock it and generate negative output pulses which are applied through condenser 67 to the control grid of the valve 65. This valve should be of the type having similar sensitivity of control by the control grid and suppressor grid. The cathode is biased positively so that the valve is normally cut-off by the suppressor grid, which is connected to ground through a resistance 68, but not by the control grid. The received pulses, which are unable to affect the valve 63, pass through the delay line 66 and unblock the valve 65, and corresponding negative output pulses are applied to the output terminal 69 through the condenser 70. The transmitted pulses, however unblock the valve 63 which then applies negative pulses to the control grid of the valve 65, thereby blocking it on the control grid, so that the transmitted pulses which arrive through the delay line 66 cannot produce any output at terminal 69.

The delay introduced by the delay line 66 should be just sufficient to give time for complete blocking of the valve 65 before pulses can arrive at the suppressor grid, and the time constant associated with the resistance 71 and condenser 72 connected to the control grid should be sufficient to ensure that the valve remains blocked until just after the pulse has disappeared from the suppressor grid.

In the circuit of Fig. 4, the positive and grounded negative terminals for the high tension operating course (not shown) are 73 and 74. The anodes of the valves 63 and 65 are connected to terminal 73 through load resistances 75 and 76. Appropriate positive bias voltages for the cathodes of the valves 63 and 65 are provided respectively by the pairs of resistances 77, 78 and 79, 80, the usual cathode by-pass condensers 81, 82 being added. The grid leak resistance for valve 63 is designated 83. The resistance 71 is connected to a tapping point on the cathode resistance 79 in order to provide a bias for the control grid which is somewhat less than the suppressor grid bias.

It may be added that, if desired, the valve 63 may be omitted, and blocking pulses for application to the control grid of the valve 65 may be obtained from a suitable stage as the amplifier 26A (Fig. 2) and applied over conductor 84A. Conductors 84A and 84B are, of course, not required when the complete circuit of Fig. 4 is employed.

The circuit of the synchronising pulse separator 29A is shown in Fig. 5, and consists of two similarly arranged valve stages, corresponding elements of which are given the same designation numbers distinguished by the letters A and B. Each stage comprises a pentode valve 85 which should be of the type having equal sensitivity of control by the control grid and suppressor grid. The anode is connected through primary winding of a transformer 86 to the positive terminal 87 for the high tension operating source (not shown), the grounded negative terminal of which is 88. The cathode and screen grid are suitably biased by means of a series resistance chain 89, 90, 91 connected between terminals 87 and 88 and cathode and screen grid by-pass condensers 92 and 93 are provided. The leak resistance for the control grid is 94 and pulses are applied to the control grid through a delay line 95.

The incoming pulses which include the close triplets of synchronising pulses, and also the channel pulses, is shown in Fig. 1 curve *a*, are applied to the input terminals 96 and 97, the latter being grounded. A terminating resistance 98 connects these terminals. Terminal 96 is connected to the input of the delay device 95A, and also to the suppressor grid of the valve 85A. The secondary winding of the transformer 86A is connected at one end through a resistance 99 to ground and at the other end to the suppressor grid of the valve 85B. The secondary winding of the transformer 86B is connected to a pair of output terminals 100 and 101.

The pulses are fed direct to the suppressor grid of valve 85A and, though the delay line 95A which should delay the pulses for a time equal to the interval between the pulses of the triplet, to the control grid of this valve, which should be biased beyond the cut off so that a pulse only appears at its anode when two input pulses coincide. It will be realised that only two output pulses can appear, which will be due to the second and third pulses of the triplet-coinciding with the delayed first and second pulses. A single random pulse may also appear due to accidental coincidence of two adjacent channel pulses.

The two output pulses are inverted by the transformer 86A and then valve 85B operates in a similar manner. The only signal which can then appear at the anode of this valve is a single pulse due to coincidence of the second pulse and the first delayed pulse as fed from transformer 86A, these pulses corresponding to the original second and third pulses. The signal pulse thus obtained at terminals 100 and 101, after suitable delay or phase shift, will be used to synchronise the master generator 23A when switch 31A is closed. It will be noted that any random pulse produced at the output of valve 85A due to co-incidence of two channel pulses will not pass through the valve 85B.

Figure 6:
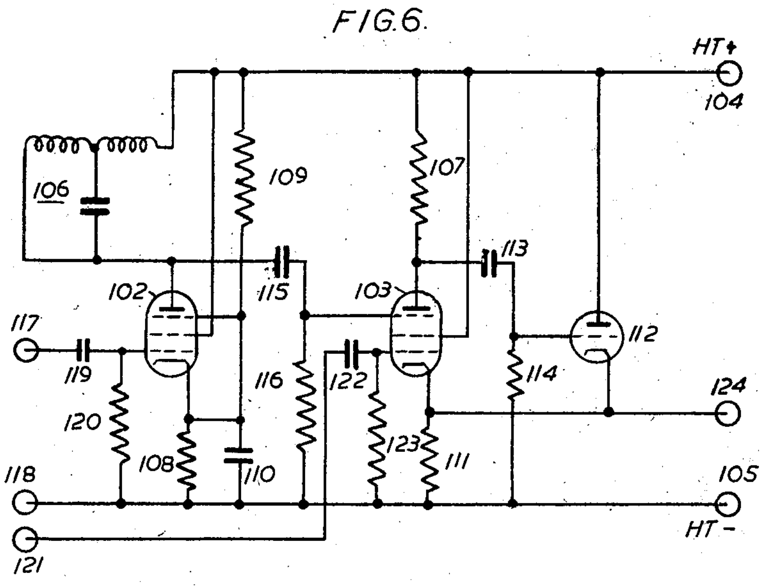
Fig. 6 shows details of a gating and demodulating arrangement employed in the system.

Fig. 6 shows circuit details for the elements 32A and 33A of Fig. 2 together. The circuit includes a valve 102 which produces gating pulses under the control of the saw-tooth waves from generator 23A, these pulses being sufficient to unblock a valve 103 to which the signal pulses are also applied from the blocking circuit 27A, and which generates corresponding duration modulated pulses. A high tension operating source (not shown) is intended to be connected to positive, and negative grounded, terminals 104 and 105. The anode of valve 102 is connected to terminal 104 through the input circuit of a delay line 106, the output end of which is short circuited. The anode of the valve 103 is connected to terminal 104 through a load resistance 107. Bias for the cathode of valve 102 is provided by resistances 108 and 109 connected in series between terminals 104 and 105, a cathode by-pass condenser 110 being included. Bias for the cathode of the valve 103 is provided by a resistance 111 connected in series with the anode-cathode circuit of a valve 112. The control grid of this valve is connected to the anode of valve 103 through a condenser 113 to ground through a resistance 114. The suppressor grid of the valve 103 is connected to the anode of valve 102 through a condenser 115, and to ground through a resistance 116.

Input terminals 117 and 118 are provided for the sawtooth waves from the generator 23A (Fig. 2). Terminal 118 is grounded and terminal 117 is connected to the control grid of valve 102 through a condenser 119, a grid resistance 120 being also supplied. An input terminal 121 for the pulses is connected to the control grid of the valve 103 through a condenser 122. A leak resistance 123 is provided for this control grid. An output terminal 124 for the duration modulated pulses is connected to the cathode of valve 103.

The output of the master saw-tooth wave generator 23 is applied in negative sense to terminal 117 and to the control grid of valve 102. The valve is a non-linear amplifier and is driven by the saw-tooth wave from anode saturation to grid cut off. A positive gating pulse will therefore be applied to the suppressor grid of valve 103, the duration of which is determined by the delay line 106. This pulse is followed by a similar negative pulse which is produced by the fly-back stroke of the saw-tooth wave and will have no effect on the valve 103. The timing of the positive gating pulse is governed by the bias supplied to valve 102 by the resistances 108 and 109. The received pulses are applied to the grid of valve 103 from terminal 121 in a positive sense, and this valve is normally biased so that it remains cut off except when a positive gating pulse is applied to its suppressor grid. The bias valve 103 is produced across the resistance 111 by the triode valve 112 which is normally in a conducting condition, and required a higher bias to cut it off than valve 103. When valve 103 conducts due to a positive gating pulse from valve 102 and a positive signal pulse from terminal 121, the resulting negative pulse from its anode cuts off valve 112, which remains cut off for a time determined by the time constant of the elements 113 and 114, and at least until the positive pulse on the suppressor grid of valve 103 disappears. It will be seen, therefore, that valve 103 does not conduct until a gating pulse applied to the suppressor grid and a signal pulse applied to the control grid coincides. When this occurs, valve 103 remains conducting until the positive pulse on its suppressor grid disappears, thus giving rise to the desired duration modulated pulse. The duration modulated pulses may be obtained from terminal 124 and are filtered and amplified by elements 34A and 35A of Fig. 2 in order to recover the signal wave at terminal 15A.

The arrangements for all the channels are the same except that the bias of the valve 102 will be adjusted to time the gating pulses suitably in each case for the channel concerned.

Figure 7:
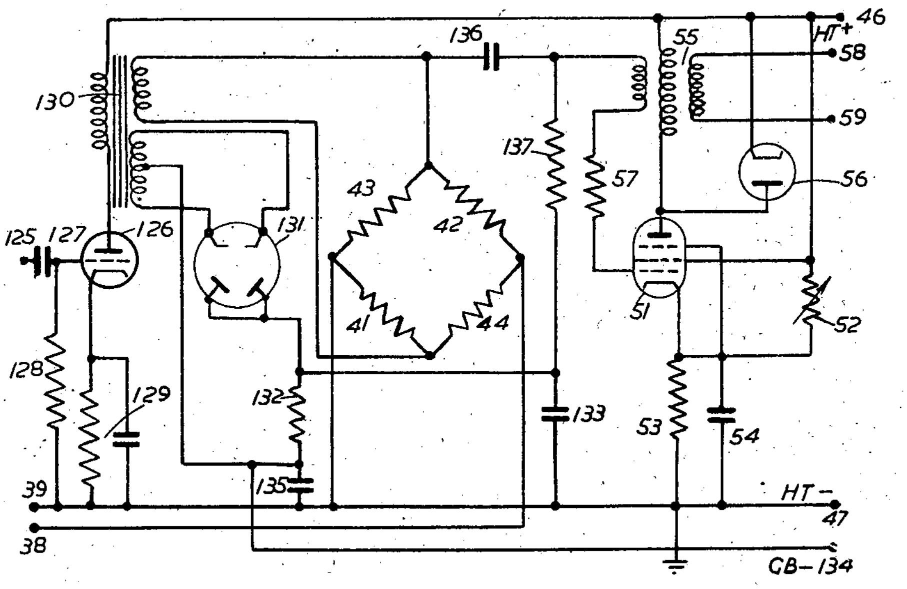
Fig. 7 shows a pulse modulator used in a modification of the system of Fig. 2.

When the channel pulses for the two directions of operation are arranged as described with reference to Fig. 1 curve *b* the general arrangement of the system will be as shown in Fig. 2, but the channel pulse generators similar to 19A have to be modified. Fig. 7 shows a channel pulse generator suitable for this system, and it is generally similar to Fig. 3, and employs a similarly arranged modulating valve 51 with associated elements which have been given the same designation numbers.

The modulating signal waves are applied to an input terminal 125 which is connected to the control grid of an amplifying valve 126 through a blocking condenser 127. The valve is provided with a grid leak resistance 128 and a cathode bias network 129. The anode of the valve is connected to terminal 46 through the primary winding of a transformer 130 having two secondary windings, one of which is connected to one pair of diagonal points of the bridge of resistances 41, 42, 43, 44. The other secondary winding is centre tapped and connected to a full wave rectifier 131 having a load resistance 132, and smoothing condenser 133. A terminal 134 for a grid bias source (not shown) is connected to the centre tap of the secondary winding of the transformer 130, and a by-pass condenser 135 is provided for this source. The upper corner of the resistance bridge is connected to the grid winding of the transformer 55 through a blocking condenser 136, and a corresponding grid leak resistance 137 is connected to the rectifier smoothing condenser 133.

The turns-ratios of the two secondary windings of the transformer 130 should be such that the bias voltage derived from the rectifier 131 and developed across resistance 132 is slightly greater than the peak value of the signal voltage applied to the resistance bridge. The saw-tooth output from generator 23A is supplied as before in positive sense to terminal 38 and then to the bridge network which, in this case, ensures that no speech frequencies are fed back to the saw-tooth generator. The instantaneous voltage at the junction of resistance 137 and condenser 136 is the sum of four voltages, namely the saw-tooth wave voltage, the signal voltage, the rectifier voltage slightly greater than the signal peak voltage, and the voltage of the bias source connected to terminal 134. The action of valve 51 is as previously described with reference to Fig. 3, except that it has an additional bias which is only present when speech signals are present. The initial bias of the valve should be adjusted by adjusting the cathode bias and/or the voltage of the bias source connected to terminal 134 so that the pulses when unmodulated occur at the beginning of the channel period, as at 7 Fig. 1 curve *b*. As soon as a speech signal appears, the rectified bias then shifts the pulse so that its unmodulated position is nearly at the centre of the channel period. Modulation then takes place as described with reference to curve *a*. In the case of the channel pulse generator at station B, Fig. 1, the rectifier 131 will be inverted, so that the corresponding rectified bias voltage has the opposite sign. The bias of the valve 51 will be adjusted so that the unmodulated position of the transmitted pulse is at the end of the channel period, as at 8, curve *b*, Fig. 1, so that as soon as a speech signal arrives, the unmodulated position will be shifted earlier to the middle of the period.

It will be understood that no modification of the demodulating arrangements will be necessary since when the received pulses are modulated, they oscillate equally about the means positions.

Figure 8:
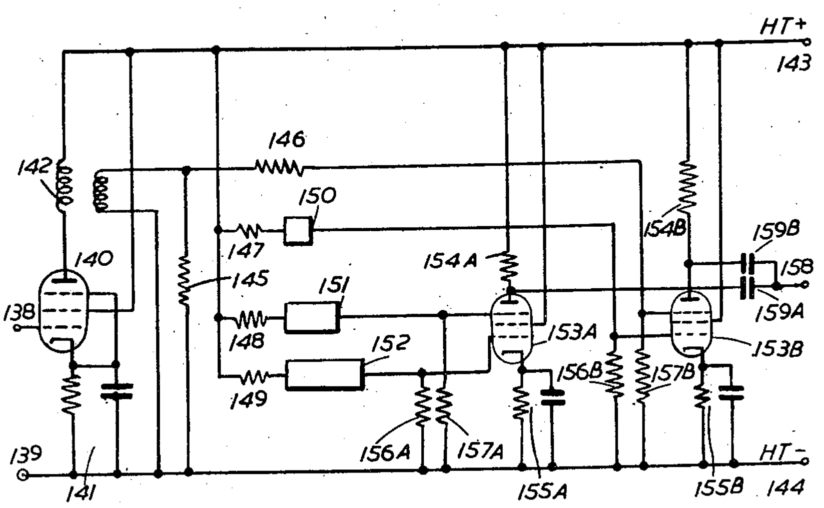
Fig. 8 shows a schematic circuit diagram of a sychronising signal generator for the modified system.

By reference to curve *b* Fig. 1, it will be seen that if the channel corresponding to period 4 is idle, and the channel corresponding to period 3 is transmitting, the pulse 7 may move close up to the pulses so that there might then be a close triplet of pulses which might produce a false synchronising signal. To avoid danger of this occurring, it would be preferable, when the system is operated in the manner explained with reference to curve *b* of Fig. 1, to employ a synchronising signal consisting of a close quadruplet of pulses. In such case the synchronising pulse generator 24A could take the form shown in Fig. 8. The saw-tooth waves from the master generator 23A are supplied to terminals 138 and 139. Terminal 138 is connected to the control grid of valve 140 which is biased by a cathode network 141. The primary winding of a suitable transformer 142 is connected between the anode and the positive terminal 143 for the high tension source (not shown), the grounded negative terminal of which is 144. A short pulse is generated in the secondary winding of the transformer 142 on the occurrence of each flyback stroke of the saw-tooth wave. The secondary winding of the transformer is terminated by a resistance 145, and the short pulse is supplied to four parallel circuits including resistances 146, 147, 148 and 149. Three of these circuits also include delay lines 150, 151 and 152.

The four parallel circuits are connected in pairs to the suppressor grid and control grid respectively of two valves 153A and 153B arranged exactly similarly. Each valve has the anode connected through a resistance 154 to terminal 143, and is suitably biased by a cathode network 155 so that it is in a conducting condition. The control grid and suppressor grid are respectively connected to ground through resistances 156 and 157. The anode is connected to an output terminal 158 through a condenser 159.

If $t$ is the time spacing desired between adjacent pulses of the quadruplet, then the delay introduced by the delay lines should respectively be $t$, $2t$ and $3t$. The transformer windings should be so connected that negative pulses are applied to the grids of the valves 153A and 153B. It will be seen that each valve will be blocked twice, first by the suppressor grid and afterwards by the control grid and accordingly four positive pulses spaced apart by the desired interval $t$ will be obtained from terminals 158.

When a quadruple synchronising signal is used, the synchronising pulse separator 29A can be similar to Fig. 5 but with an extra valve stage and delay line arranged exactly like the valve stage 85A and delay line 95A.

What is claimed is:

1. A two-way multichannel electric pulse time modulation communication system for operation over a communication medium common to both directions of transmission, comprising means for dividing the signalling time into a series of equal signalling periods, means for dividing each signalling period into a plurality of channel periods, means for transmitting a train of pulses in each direction for each channel, the said trains of pulses being so timed that at any station of the system a transmitted and a received pulse occur during the corresponding channel period with a predetermined spacing between said transmitted and received pulse in their unmodulated condition, and means for time modulating the pulses of each train to a depth greater than half said predetermined spacing so that at least part of the said channel period is common to the periods of maximum time excursion of the said transmitted and received pulses.

2. A multichannel electric pulse time modulation system for two-way communication between two stations over a communication medium common to both directions of transmission, comprising at the first station, means for transmitting a train of regularly repeated synchronising signals defining a succession of signalling periods, and means for transmitting in each signalling period a series of original pulses each corresponding to a different channel, and each occurring during a corresponding channel period; at the second station means controlled by the synchronising signals for transmitting in each signalling period a series of return pulses each corresponding to a different one of the said channels, and means for timing the return pulses so that each occurs during the corresponding channel period at the said first station with the predetermined spacing between the original and the return pulse in their unmodulated condition at said first station; and means at both stations for time modulating the pulses of each channel to a depth greater than half said predetermined spacing so that the original and return pulses at the said first station each extends during modulation into a common portion of the corresponding channel period.

3. A system according to claim 1, including means for timing the original and return pulses so that when no signals are being conveyed in either direction, the original and return pulses divide each channel period into three approximately equal portions.

4. A system according to claim 2 including means for timing the original and return pulses so that when no signals are being conveyed in either direction, the original and return pulses occur at opposite ends of the corresponding channel period.

5. A system according to claim 4 comprising means for shifting the unmodulated position of either pulse approximately to the centre of the channel period as soon as signals commence to be conveyed in the corresponding direction.

6. A system according to claim 2, including means for adjusting the period of repetition of the pulses of each channel to be equal to the transit time of a pulse between the two stations, or to an integral multiple of the said transit time.

7. A system according to claim 2 further comprising at the first station a master periodic wave generator, means controlled by the said generator for generating a train of regularly repeated synchronising signals each consisting of a group of closely spaced pulses, means controlled by the said generator for generating and interleaving a plurality of trains of original channel pulses occurring during corresponding channel periods and means for transmitting the synchronising signals and channel pulses over the communication medium to the second station and at the second station a second master periodic wave generator, means for applying the synchronising signals to synchronise the second master generator, means controlled by the second master generator for generating and interleaving a plurality of trains of return channel pulses occurring during the corresponding channel periods, and means for transmitting the return channel pulses over the communication medium to the first station; and means at both stations for individually modulating each channel pulse train with a corresponding signal.

8. A system according to claim 7 comprising at each station means for receiving the channel pulses transmitted from the other stations, means controlled by the corresponding master generator for separating the trains of received channel pulses and directing each of them to a corresponding demodulating device, and means for recovering the corresponding modulating signal from each demodulating device.

9. A system according to claim 8 comprising means at each station for blocking the receiving means during periods when pulses are being transmitted from the same station.

10. A system according to claim 8 further comprising at the second station means controlled by the second master generator for generating a second train of regularly repeated synchronising signals each consisting of a group of closely spaced pulses, and means for transmitting the second train of regularly repeated synchronising signals to the first station; and at the first station means controlled by the second train of synchronising signals for synchronising the master generator at the said first station.

CHARLES THOMAS SCULLY.

REFERENCES CITED

The following references are of record in the file of this patent:

UNITED STATES PATENTS

| Number | Name | Date |
|---|---|---|
| 2,262,838 | Deloraine | Nov. 18, 1941 |
| 2,363,062 | Hartley | Nov. 21, 1944 |
| 2,395,467 | Deloraine | Feb. 26, 1946 |
| 2,410,350 | Labin | Oct. 29, 1946 |
| 2,412,974 | Deloraine | Dec. 24, 1946 |
| 2,418,116 | Grieg | Apr. 1, 1947 |
| 2,425,314 | Hansell | Aug. 12, 1947 |
| 2,425,315 | Atwood | Aug. 12, 1947 |
| 2,425,316 | Dow | Aug. 12, 1947 |
| 2,447,233 | Chatterjea | Aug. 7, 1948 |
| 2,457,986 | Edson | Jan. 4, 1949 |

FOREIGN PATENTS

| Number | Country | Date |
|---|---|---|
| 584,457 | Great Britain | Jan. 15, 1947 |
| 596,700 | Great Britain | Jan. 8, 1948 |
| 604,130 | Great Britain | June 29, 1948 |